Patented Apr. 18, 1933

1,904,367

UNITED STATES PATENT OFFICE

IVAN GUBELMANN, OF SOUTH MILWAUKEE, WISCONSIN, ASSIGNOR, BY MESNE ASSIGNMENTS, TO E. I. DU PONT DE NEMOURS & COMPANY, A CORPORATION OF DELAWARE

7.7'-DICHLORO FLAVANTHRONE AND THE PROCESS OF MAKING SAME

No Drawing.   Application filed September 4, 1928.   Serial No. 303,961.

This invention relates to 7.7'-dichloro flavanthrone and to a process of preparing the same.

It is an object of this invention to provide a method of preparing 7.7'-dichloro flavanthrone as it is a valuable vat dyestuff which dyes cotton in yellow shades greener than the unsubstituted flavanthrone. It may also be used as starting material for the preparation of other dyestuffs.

Other and further important objects of this invention will become apparent from the following description and appended claims.

I have discovered that 7.7'-dichloro flavanthrone can be prepared from 2-amino-7-chloro anthraquinone, the latter product being the subject of U. S. Patent No. 1,810,012, issued June 16, 1931, Serial No. 203,263 entitled "2-amino-7-chloro anthraquinone and a process of making the same". The 2-amino-7-chloro anthraquinone can be transformed into the 7.7'-dichloro flavanthrone by the simple adaptation of known methods for the preparation of flavanthrone bodies from beta amino anthraquinone.

Without limiting my process to any particular procedure, the following example serves to illustrate the preferred embodiment of the invention.

Example

Into 100 parts of nitrobenzene are charged 30 parts of antimony pentachloride. There are then added 10 parts of 2-amino-7-chloro anthraquinone. This mixture is slowly heated to 200 to 210° C. and held at this temperature for two hours. The melt is cooled to 70 to 80° C. and filtered. The filter cake is washed with about 20 parts of nitrobenzene at 70 to 80° C. The residual nitrobenzene is removed by washing with a small amount of alcohol. The product, 7.7'-dichloro flavanthrone, is dried and ground.

7.7'-dichloro flavanthrone is a yellow powder having most probably the following formula:

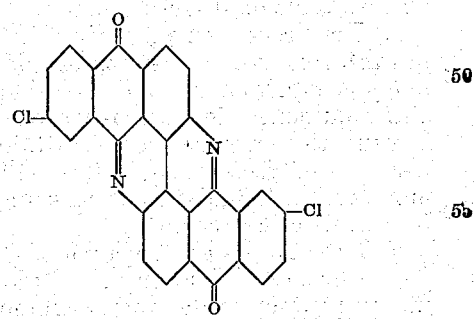

It is soluble in concentrated sulfuric acid, imparting thereto a yellowish coloration which upon dilution with water separates in yellow flocks. It is practically insoluble in cold benzene, alcohol, nitrobenzene and sparingly soluble in hot nitrobenzene and aniline. It is insoluble in dilute acid or dilute caustic alkalies. It dyes cotton in blue shades from an alkaline hydrosulfite bath which change to greenish yellow shades upon treatment with suitable oxidizing agents. The product dyes cotton much greener shades than the unsubstituted flavanthrone.

I am aware of the fact that numerous details of the above method may be varied, as for example other temperatures may be employed than those given and other condensing agents may be employed, and I, therefore, do not purpose limiting the patent granted hereon otherwise than necessitated by the prior art.

I claim as my invention:

1. The process of preparing 7,7'-dichloro flavanthrone, which comprises treating 2-amino-7-chloro anthraquinone with antimony pentachloride in nitrobenzene at a temperature of about 200 to 210° C.

2. The process of preparing 7,7'-dichloro flavanthrone, which comprises treating 2-amino-7-chloro anthraquinone with antimony pentachloride in nitrobenzene at a temperature of about 200 to 210° C, cooling and filtering to recover 7,7'-dichloro-flavanthrone.

3. As a new article of manufacture 7,7'-dichloro-flavanthrone, having most probably the following formula:

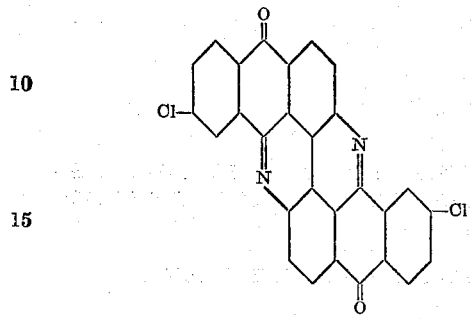

which compound dyes cotton from an alkaline hydrosulfite bath in blue shades which change to greenish yellow upon treatment with suitable oxidizing agents.

4. The process of preparing 7,7'-dichloro flavanthrone, which comprises adding antimony pentachloride and 2-amino-7-chloro anthraquinone to nitro-benzene, slowly heating the mixture until it attains a temperature of from about 200 to 210° C. and maintaining the mixture at this temperature to complete the reaction.

5. The process of preparing 7,7'-dichloro flavanthrone, which comprises adding antimony pentachloride and 2-amino-7-chloro anthraquinone to nitro-benzene, slowly heating the mixture until it attains a temperature of from about 200 to 210° C. and continuing the heating at this temperature for a period of approximately two hours.

In testimony whereof I have hereunto subscribed my name.

IVAN GUBELMANN.